(No Model.)
W. P. ALLEN.
DEVICE FOR CONVERTING MOTION.
No. 351,560. Patented Oct. 26, 1886.
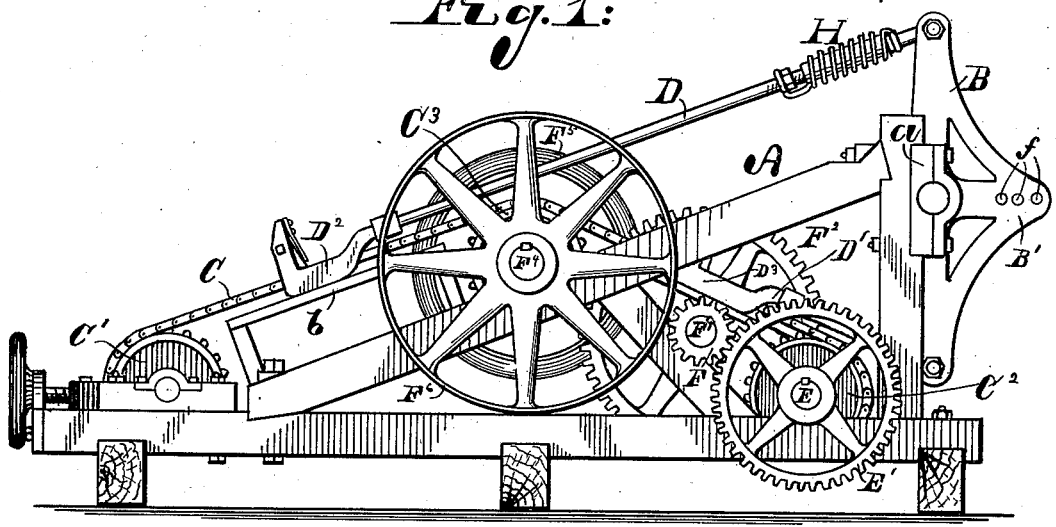
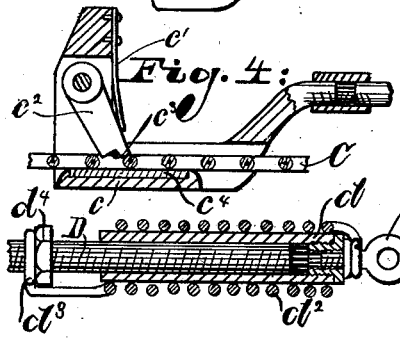 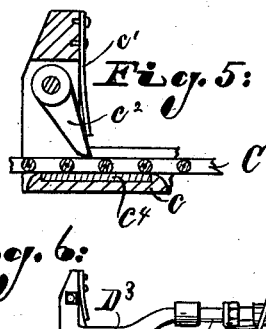 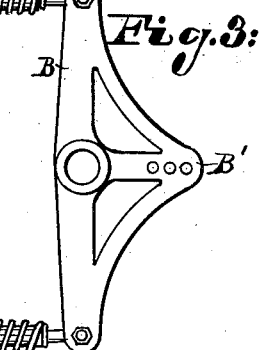
 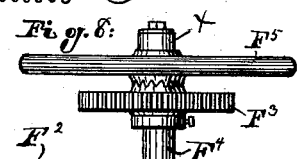
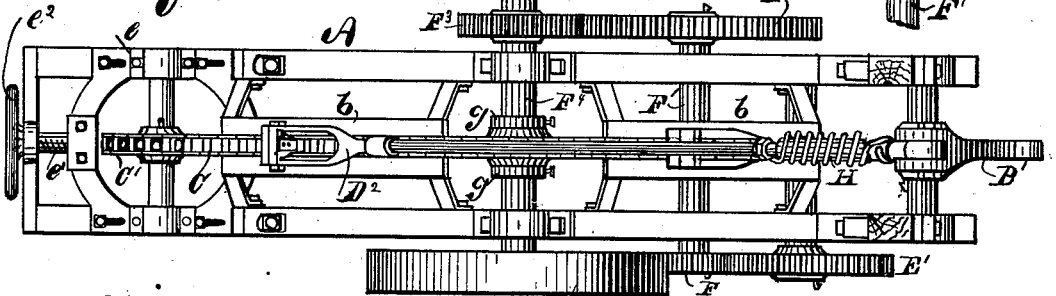 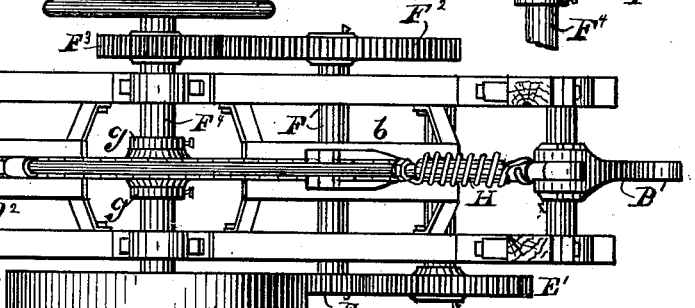
Attest:
F. Willis Gaines.
P. J. Clevenger.
Inventor:
Wm. P. Allen
By ____ Atty.

UNITED STATES PATENT OFFICE.

WILLIAM P. ALLEN, OF WYOMING, ASSIGNOR TO THE LITTLE GIANT POWER CONVERTER COMPANY, OF CINCINNATI, OHIO.

DEVICE FOR CONVERTING MOTION.

SPECIFICATION forming part of Letters Patent No. 351,560, dated October 26, 1886.

Application filed March 15, 1886. Serial No. 195,217. (No model.)

*To all whom it may concern:*

Be it known that I, WILLIAM P. ALLEN, a citizen of the United States, residing at Wyoming, in the county of Hamilton and State of Ohio, have invented certain new and useful Improvements in Devices for Converting Motion, of which the following is a specification.

My invention relates to that class of power-converters in which a reciprocating motion is converted into a rotary motion by the employment of an endless belt or chain in connection with reciprocating devices adapted to engage said endless belt or chain when moving in one direction, and to be released from and moved independently therewith when traveling in the opposite direction.

The objects of my invention are, first, to provide in connection with the oscillating beam two reciprocating devices moved thereby, said reciprocating devices being adapted to be moved alternately backward and forward in opposite directions and engage with the endless belt or chain when moved in a forward direction only, so that one of said devices is always engaged with the said endless belt or chain, thus producing a continuous application of the power to said belt, whereby an uninterrupted rotary motion is sustained; second, to so arrange the endless belt or chain in connection with the oscillating or vibrating beam that each of the reciprocating devices attached to said beam will move substantially parallel with said chain or belt in applying the power thereto; third, to provide clutches of novel construction on the reciprocating devices, whereby the liability of the devices to slip on the said endless belt or chain is obviated.

My invention consists in the constructions and combinations of parts hereinafter described and claimed.

In the accompanying drawings, Figure 1 is a side elevation of a machine embodying my invention. Fig. 2 is a plan of the same. Fig. 3 is a detailed view of the oscillating beam with the reciprocating devices connected thereto. Figs. 4 and 5 are detailed views of the clutches. Figs. 6 to 8 are detailed views of some of the parts referred to hereinafter.

In the accompanying drawings, A represents the main frame, which is preferably constructed of a triangular form, to the rear end of which is attached a vibrating beam, B, journaled in suitable bearings, $a$, on the said frame.

C is an endless belt or chain adapted to pass over suitable wheels, C' C$^2$, journaled in the frame A. This endless belt C, I preferably make in the form of a chain, as shown in detail in Fig. 7. Attached to each end of the oscillating beam B are connecting-rods D and D', provided at their outer extremities with suitable clutching devices, D$^2$ and D$^3$, adapted to engage with said chain when moved in one direction and to be released therefrom when moved in the opposite direction. The wheels C' C$^2$, over which the endless chain passes, are made in the form of sprocket-wheels, and the one C$^2$ is secured on the shaft E, which turns in suitable bearings on the frame, and is provided on one side with a spur-gear, E', adapted to mesh with the pinion F on shaft F', which shaft extends through frame A, and is provided on the other end with a gear, F$^2$, adapted to engage with the pinion F$^3$ on the shaft F$^4$, which carries at one end a fly-wheel, F$^5$, and at the other a band-wheel, F$^6$, from which the power is applied to the machinery to be driven.

The oscillating beam B is provided at the center with a projecting arm, B', to which may be attached a pitman or other reciprocating device, from which the power is to be transmitted. Now, as the beam B is oscillated in either direction, it will be seen that one of the connecting-rods, D, will be moved in one direction along the chain, and the other, D', in the opposite direction. The clutching devices D$^2$ and D$^3$ on the ends of the connecting-rods are adapted to engage with the chains when moved in a forward direction only, so that one of the clutching devices will be engaged with said chain and draw in a forward direction, while the other is passing backward along the said chain, ready to engage therewith, when the motion of the oscillating beam is reversed. In this way, it will be seen, a continuous motion is imparted to the endless belt, which is in turn transmitted to the sprocket-wheel C$^2$, and thence, through the medium of the train of gearing above described, to the pulley F$^6$, from which it may be transmitted to any desired point by means of belts or otherwise.

Both of the clutching devices, it will be seen, engage with the endless chain at a point between the respective supporting-wheels C' C², and on the same side of the belt, so that a forward motion of either of said clutches produces a forward motion of the belt. The clutches being attached to the connecting-rods, which are connected to the opposite ends of the vibrating beam, it will be seen that if the belt or chain C were extended in a straight line from one of the supporting-wheels to the other, one or both of the connecting-rods would be drawn by each vibration of the beam at an angle to said chain. Now, in order that the clutching devices may be moved substantially parallel with the endless chain at the point where it engages therewith, I provide a sprocket or a raising wheel, C³, located, preferably, about half-way between the main supporting-wheel C' C², over which the endless chain C is adapted to pass.

The clutches D² D³ are each adapted to engage with the endless chain at a point between the supporting or raising wheel C³ and one of the end wheels, C' C². This raising-wheel C³ is placed at a sufficient height above the center line of the wheels C' C² that the angle of the chain in passing over the raising-wheel C³ is substantially equal to the angle at which the connecting-rods D D' are connected to the beam B. It will be seen, therefore, that by this construction the movement of each of the connecting-rods D D', though attached to opposite ends of the beam B, is substantially parallel with the direction of the chain C at the point at which it is adapted to engage therewith.

Immediately under the chain, at the point where it is engaged by the respective clutches, D² and D³, I provide slides $b\ b$, on which the said clutches are adapted to rest. Each clutch consists, preferably, of an L'-shaped piece provided on one side with a bearing, $c$, over which the chain is adapted to pass, and at the other side with a pivot-pawl, adapted to be forced into engagement with said chain by a small spring, $c'$. This pawl may be made, as shown in Fig. 4, with a notch, $c^2$, adapted to engage with the respective ends of the links of the chain, or, as shown in Fig. 5, with a single point adapted to extend across the chains and engage on the sides thereof. The sides of the chain are preferably made of uniform width, equal to the diameter of the ends of the links, so that when the pawl $c^2$ is constructed as shown in Fig. 5 the clutch will engage with the sides of said chain at any point. When, however, other forms of chains are used, in which the sides of the links are of less diameter in the ends, the form of pawl shown in Fig. 4 will be preferable. In this case the pawl is adapted to engage in the ends of the links only, being provided with the notch $c^3$. Two faces are provided on the end thereof, which may engage with the end bar of the link. In case the chain has advanced until one end bar has passed the longer projection of the pawl, the next succeeding end bar will be brought into position to be engaged by the shorter projection or lower face of said pawl. In this way the lost motion resulting from the alternate engagement and disengagement of the clutches is reduced to the minimum.

Now, in order that the power may be transmitted in a uniform manner, it is desired that an elastic or yielding connection be established between the beam B' and the driving-wheel C². I preferably accomplish this by placing on each of the connecting-rods D D' a spring-connection, H, which is constructed as follows: The end of the connecting-rod is adapted to project into a sleeve, $d$, in one end of which is secured an eye, $d'$, by which the connection is made to the beam B. On the outside of the sleeve $d$ is a coil-spring, $d^2$, one end of which is secured around the eye $d'$, the other end being formed into a loop or ring, $d^3$, which is slipped over the connecting-rod and held there by a nut, $d^4$. The end of the connecting-rod is screw-threaded, so that the nut $d^4$ may be adjusted thereon. The sleeve $d$ fits loosely over the end of the connecting-rod, and is adapted to slide freely thereon. One end of the spring $d^2$ being connected to the sleeve and the other to the connecting-rod, an elastic connection is established between the beam B and the connecting-rod D, through which the power applied to the sprocket-wheel C² is transmitted. The nut $d^4$ being adjustable on the connecting-rod, it will be seen that the tension of the spring $d^2$ may be readily adjusted, as desired. It is obvious that this connection admits of many modifications, and that a like result would be produced where an elastic connection was applied at any point in the mechanism between the beam B and the gearing which transmits the power from the endless belt or chain to the sprocket-wheel C². The sprocket-wheel C² is secured in rigid boxes on the frame. The wheel C', however, is preferably supported in a sliding frame and suitable means provided for moving said frame back and forth and to hold it in different positions of adjustment. This I preferably accomplish by a screw, $e'$, adapted at one end to engage in said frame, which is tapped out to receive it, the screw being provided at the other end with a hand-wheel, $e^2$, by means of which it may be readily turned to move the sliding frame to any desired position of adjustment. Means are thus furnished by which the endless chain may be tightened or loosened at will.

In order that the device may be as compact as possible, I preferably journal the raising-wheel C³ on the supporting-shaft F⁴, which carries the fly-wheel F⁵ and the pulley F⁶, the said shaft being provided with collars $g$, to hold the said wheel against lateral movement thereon.

Each of the clutches is preferably provided at the bottom with a steel friction-plate, $c^4$, over which the chain is adapted to pass, to lessen the wear thereon; or, if desired, friction-rollers may be used, whereby the friction between the chain and clutch when moving in opposite directions will be considerably reduced.

Various other modifications may be employed, which will readily suggest themselves.

The slides $b$ can be modified in many different ways; or, if desired, they could be entirely dispensed with by so constructing the clutches that they would bear on the chain above and below the projecting arm B' only.

The beam B is preferably provided with a series of holes, $f$, to which the pitman from which the power is derived can be attached, so that by moving the connection to or from the center the length of the stroke may be varied.

This device is particularly adapted for transmitting the reciprocating motion of a windmill into a rotary motion, for the purpose of driving grinding-mills or other similar machinery, though it may readily be applied for any other purpose for which it is adapted.

If desired, a safety device, as shown in Fig. 8, may be employed in conjunction with the spring-connections H, or, in lieu thereof, to relieve the different parts of the mechanism from sudden jars or strains. This device is constructed by providing a series of serrations on the hub of the spur-gear $F^3$, adapted to engage with similar serrations on the hub of the fly-wheel $F^5$. The spur-gear $F^3$ is in this case journaled loosely on its shaft, but is held against longitudinal movement thereon by a collar on one side and the fly-wheel on the other. The fly-wheel is secured to the shaft by a spline or other suitable device, and is adapted to turn with said shaft, but is capable of a slight longitudinal movement thereon. A spring-collar, $x$, preferably of rubber, presses the serrated hub of the fly-wheel against the serrations on the gear $F^3$, thus forming a clutch, through the medium of which the power is transmitted to the shaft. Any undue strain on the gear $F^3$ will cause the clutch-faces to slip, thus relieving the other portions of the mechanism. The same result might be accomplished by connecting some of the parts by a pin adapted to break under an undue strain.

I claim—

1. The combination, with an endless belt or chain passing over suitable supporting-wheels, of an oscillating beam to each end of which is attached connecting-rods, and suitable clutching devices adapted to engage said endless belt or chain at points between the said supporting-wheels and on the same side thereof; whereby a continuous motion of the endless belt is secured by the oscillating motion of said beam, substantially as and for the purpose set forth.

2. The combination, with the endless belt or chain passing over suitable supporting-wheels, the oscillating beam, and the connecting-rods attached to each end of said beam and adapted to engage with said endless belt or chain at a point between the supporting-wheels on the same side thereof, of a raising-wheel between said supporting-wheels, adapted to raise the belt or chain between the points of engagement by said clutches, so that the movement of said clutches shall be substantially parallel with the direction of the chain, substantially as specified.

3. The combination, with the endless belt or chain passing over suitable supporting-wheels, and a raising-wheel between said supporting-wheels, of an oscillating beam, connecting-rods attached to said beam at either side of its center of oscillation, and clutching devices adapted to engage with said endless belt or chain at points between said raising-wheel and the respective supporting-wheels, substantially as and for the purpose set forth.

4. The combination, with the endless belt or chain passing over suitable supporting-wheels, and a raising-wheel between said supporting-wheels, adapted to elevate said chain at one side, of an oscillating beam, connecting-rods attached to said beam at each side of its center of oscillation, clutching devices on either side of said rods, adapted to engage with said chain when moving in a forward direction, and slides for supporting said clutching devices, substantially as and for the purpose set forth.

5. The combination on the main frame of the supporting-wheels at each end thereof, an endless chain passing over said supporting-wheels, a raising-wheel between said supporting-wheels adapted to elevate said chain, an oscillating beam journaled at its center on said frame, connecting-rods attached to said beam at each side of its center of oscillation, said connecting-rods being provided with suitable clutching devices adapted to engage the endless chain or belt, a train of gearing connected to one of said supporting-wheels, and an elastic connection between said beam and said supporting-wheels, substantially as and for the purpose set forth.

6. The combination, with the chain C, of the clutching devices having a pivoted pawl therein adapted to engage with the links of said chain, said pawl being notched out at its lower end, substantially as and for the purpose set forth.

7. The combination, with the endless chain, suitable sprocket-wheels therefor, and the oscillating beam, of sleeves connected to said oscillating beam at either side of its center of oscillation, a spring on the outside of said sleeves, the connecting-rod adapted to engage at one end with the said endless chain, and at the other end to enter said sleeve, and a nut on said connecting-rod, to which the end of the spring is secured on said rod, substantially as and for the purpose as set forth.

8. The combination of the main frame, the supporting-wheels at each end thereof, the endless chain passing over said supporting-wheels, the oscillating beam at one end of said frame, connecting-rods attached to said oscillating beam at either side of its center of oscillation, clutching devices on the ends of said connecting-rods to engage said chain, a spring-connection between said beam and said connecting-rod, and means for transmitting power over one of said supporting-wheels to a fly-wheel shaft, on which is journaled a raising-wheel, $C^3$, substantially as and for the purpose as set forth.

9. The combination, with the main frame, the supporting-wheels thereon, the endless belt or chain passing over said supporting-wheels, the oscillating beam, connecting-rods attached thereto at either side of its center of oscillation, clutching mechanism on said connecting-rods to engage said chain, and means for varying the tension of said chain, substantially as and for the purpose as set forth.

10. The combination, with the main frame, the supporting-wheels thereon, an endless chain passing over said supporting-wheels, the raising-wheel between said supporting-wheels, adapted to elevate said chain, the oscillating beam, connecting-rods attached to said beam at each side of its center of oscillation, clutching devices on said connecting-rods adapted to engage said chain, one of said supporting-wheels being journaled in the sliding frame, and a hand-screw attached to said sliding frame, substantially as and for the purpose as set forth.

In testimony whereof I have hereunto set my hand this 5th day of March, A. D 1886.

WILLIAM P. ALLEN.

Witnesses:
W. H. COWGUILL,
W. P. BIDDLE.